United States Patent [19]

Dyke

[11] Patent Number: 4,750,293

[45] Date of Patent: Jun. 14, 1988

[54] PLANT SUPPORT DEVICE

[75] Inventor: David E. Dyke, Vincent, Ohio

[73] Assignee: Dyke's Berry Farm, Vincent, Ohio

[21] Appl. No.: 905,154

[22] Filed: Sep. 9, 1986

[51] Int. Cl.⁴ .............................................. A01G 17/06
[52] U.S. Cl. ....................................... 47/47; 248/316.7
[58] Field of Search ................... 47/47, 44, 70, 45, 46; 248/121, 316.7; 403/397; 256/47, 48

[56] References Cited

U.S. PATENT DOCUMENTS

| | | |
|---|---|---|
| D. 231,628 | 5/1974 | Bartels . |
| 1,536,678 | 5/1925 | Markowski . |
| 1,536,679 | 5/1925 | Markowski . |
| 1,587,740 | 6/1926 | Wiswell ................... 47/47 |
| 1,890,217 | 12/1932 | Dobbins . |
| 1,898,164 | 2/1933 | Baur ....................... 47/47 |
| 2,618,902 | 11/1952 | Prescott . |
| 2,903,823 | 9/1959 | Westford . |
| 3,061,976 | 11/1962 | Carroll et al. . |
| 3,188,771 | 6/1965 | Ballai . |
| 3,302,328 | 2/1967 | King . |
| 3,324,592 | 6/1967 | Prenner et al. . |
| 4,176,494 | 12/1979 | Boucher et al. . |
| 4,483,098 | 1/1984 | Anderson . |

FOREIGN PATENT DOCUMENTS

| | | |
|---|---|---|
| 149568 | 8/1950 | Australia . |
| 3113199 | 10/1982 | Fed. Rep. of Germany . |
| 329592 | 8/1903 | France ................... 47/44 |
| 366691 | 10/1906 | France . |
| 119713 | 9/1947 | Sweden . |
| 9793 | of 1911 | United Kingdom . |
| 123922 | 3/1919 | United Kingdom . |
| 579693 | 8/1946 | United Kingdom . |
| 714110 | 8/1954 | United Kingdom . |

Primary Examiner—Robert A. Hafer
Assistant Examiner—Danton D. DeMille
Attorney, Agent, or Firm—Oblon, Fisher, Spivak, McClelland & Maier

[57] ABSTRACT

A plant support device, which includes a longitudinally extending support member having a first opening formed in a wall portion thereof and a longitudinal opening extending at least part of the length of the support member; a flexible band-like clip member having a first flat end portion positioned in the first opening and within the longitudinal opening; a first straight flat leg portion connected to the first flat end portion; a flexible intermediate leg portion connected to the first leg portion; and a second straight flat leg portion connected to the flexible intermediate leg portion and extending to a position adjacent the first flat end portion.

5 Claims, 2 Drawing Sheets

PLANT SUPPORT DEVICE

BACKGROUND OF THE INVENTION

1. Field of the Invention

The present invention is directed to a plant support device utilizing a pole and a series of support clips.

2. Description of the Prior Art

Known plant supports are characterized by a wooden stake positioned adjacent the base of a plant such that portions of the plant are tied to the stake by string or twine and thus require significant labor and the individual attachment of vines of the plant to the wooden stake. It has been experienced that plant supports of this type do not efficiently retain the plants off of the ground due to slippage of the securing members on the wooden stake. In addition, support devices of this type are characterized by being heavy and cumbersome to install. In addition, such are typically not uniform in size and do not have a life span of longer than a few years due to rotting of the wood or splitting after being exposed to an outside environment over a period of a few years. Accordingly, devices of this type are characterized by costly material and labor.

SUMMARY OF THE INVENTION

An object of the present invention is to provide a plant support device which serves to overcome the disadvantages noted hereinabove with respect to the prior art.

In particular, the basic support device in accordance with the present invention consists of attaching a plurality of plastic support clips into selected slits formed along the side of a hollow plastic polyvinyl chloride (PVC) support pole. The support clips are held in place by tension of the side opposing the inserted end with the clips being inserted into the support pole and the pole then being inserted into the ground next to the plant to be supported. The trunk or stem of the plant to be supported is then inserted into the clip by pressing it between the support pole and the unattached, extended end of the support clip. New plant growth is subsequently attached to the support pole by inserting it into clips above the original point of attachment. Plants may be detached from the support device either by removing the clips or by sliding the same between the support pole and the unattached end of the support clip so as to therefore reverse the attachment procedure.

The support device in accordance with the present invention can be utilized to support any horticultural crop or plant that would normally, or could potentially, benefit from such support. Including in these crops are the following: tomatoes, pole beans, dwarf fruit trees, ornamental trees and vines, cucurbits, tree poinsettias and foliage plants.

The support clips in accordance with the present invention can be constructed of any suitable type of plastic or metal in a variety of shapes (pentagon, oval, rectangular, circular, etc.), sizes, thicknesses and widths to suit the crop to be supported. The support clips can also be modified so as to be attached to a wooden stake. The modified support clip can be attached to a wooden stake by the use of staples, nails or tacks. Plants are attached to a wooden support with modified support clips in the same manner as used in conjunction with the plastic support pole. The spacing between the support clips and the height, diameter and construction material of the support pole can be modified during the manufacturing process so as to meet the support requirements of the crop to be supported.

A further object of the present invention is to provide a support device which serves to hold the plants up off the ground in a manner preferable to that conventionally utilized. Such invention also allows easier harvesting of crops, such as tomatoes, as compared with the traditional wire tomatoe cage. The present invention also is far superior to the traditional wooden stake having twine or string attached thereto in that it is much lighter, is uniform in size, is much longer lasting (i.e. 10-15 year life span), is easier to insert or drive into the ground, is easily sterilized and is more esthetically pleasing. In addition, such is not characterized by rotting or splitting and will hold plants more securely while allowing for expansion and growth of the plant. More importantly, such offers a tremendous savings in terms of labor and no separate attachment of twine or tying is required in properly securing the plant to the support device. Each attachment of the plant to the device requires only 1 to 3 seconds and thus the present invention represents a large savings in material and labor cost for commercial growers currently utilizing either the Florida weave or trellising for supporting tomatoes. The present invention also is characterized by numerous advantages from the viewpoint of manufacturing in that it requires a very low capital investment for the necessary equipment, no assembly is required, and such is light in weight, easy to package and inexpensive to ship.

In accordance with the present invention, the support clips can be provided in different sizes, shapes and thicknesses to accommodate different plants to be supported. The different stakes and clips can be easily interchanged to provide a custom stake for any horticultural crop or ornamental plant that is normally staked or could benefit from being supported. The support clips serve to hold a plant as firmly to a stake as tying but have the capability of expanding as the plant grows as compared with tying which requires lossening initially to allow for such expansion. In addition, the support device of the present invention assures that the plant will sway much less when held by the support clip than when held by a tie and it is much easier to detach a plant from the support device than from one tied to a stake. Furthermore, the support stake with detachable clips are superior to providing permanent clips insofar as it is easier to package the same for shipment, such can be packaged in smaller containers, broken clips can be replaced more readily and different clips can be added for use with different crops.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENTS

Figure 1:
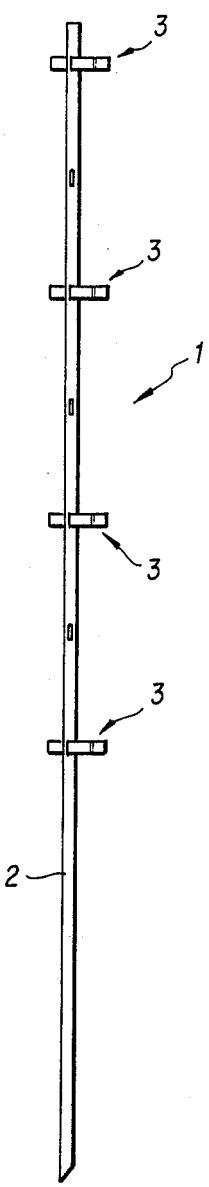
FIG. 1 illustrates the plant support device in accordance with the present invention.
Figure 2:
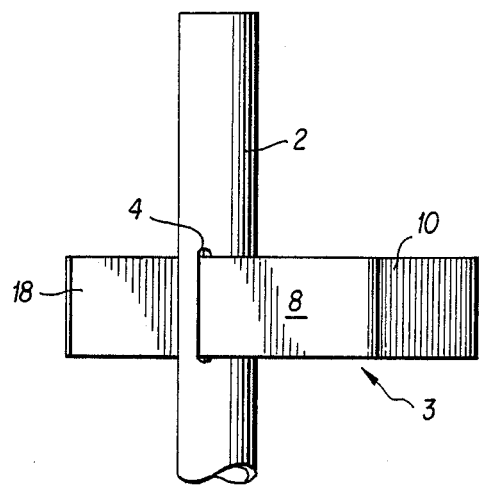
FIG. 2 is an enlarged view of a portion of the plant support device shown in FIG. 1.
Figure 3:
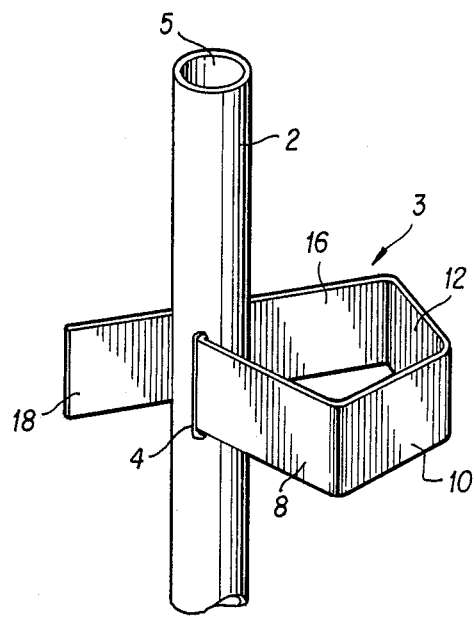
FIG. 3 is a perspective view of the plant support device shown in FIG. 2.

The plant-support device 1 in accordance with the present invention includes, as illustrated, a hollow polyvinyl chloride support member in the form of a pole 2 having a longitudinal opening 5 formed therein extending at least part of the length of the support member. A flexible band-like clip member 3 is positioned at one or more opening 4 formed within pole 2. The clip member 3 in accordance with the first embodiment has a first flat end portion 6 positioned in the opening 4 and within opening 5. Clip member 3 also includes a first straight flat leg portion 8. The flexible intermediate leg portion 14 consists of a first flat intermediate leg portion 10 connected to the first leg portion 8 and a second flat intermediate leg portion 12 connected to the first flat intermediate leg portion 10. A second straight flat unsecured leg portion 16 having a free end is connected to the flexible intermediate leg portion 14 and extends to a position adjacent to first flat end portion so as to be either biased into engagement with pole 2 or slightly offset therefrom to form a gap for insertion and removal of plant stems therethrough.

The second flat leg portion 16 includes an end portion 18 located at an end opposite the flexible intermediate leg portion 14 and which extends beyond first flat end portion 6 to a side of pole 2 opposite the flexible intermediate leg portion 14.

Figure 4:
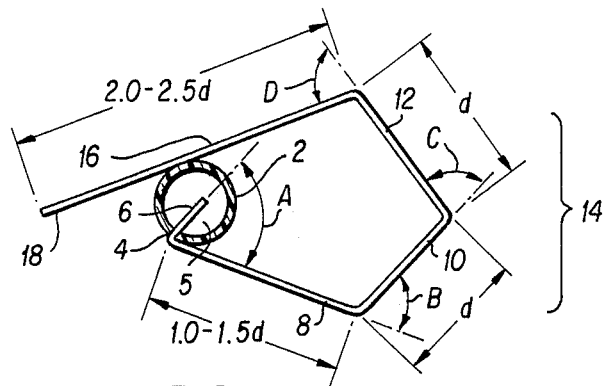
FIG. 4 is a top view of the plant support device shown in FIG. 2.

Clip member 3 is, as illustrated in FIG. 4, dimensioned such that the first and second flat intermediate leg portions are of length d whereas first straight flat leg portion 8 has a length of 1.0 to 1.5 d. Correspondingly, second flat leg portion 16 has a length of 2.0 d to 3.0 d.

The angular relationship between each of the above-noted leg portions is as illustrated in FIG. 4 wherein angle A is from 60° to 80°, angle B is from 60° to 80°, angle C is from 70° to 90° and angle D is from 60° to 80°.

Figure 5:
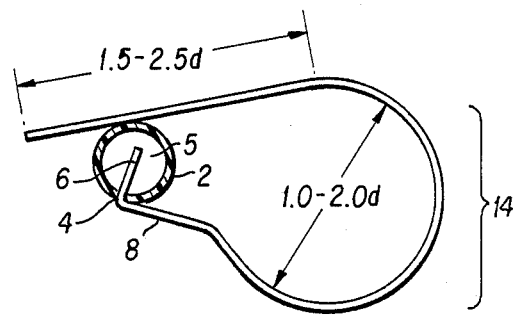
FIG. 5 is a top view of a second embodiment of the present invention.

A second embodiment of the present invention is as shown in FIG. 5 wherein the flexible intermediate leg portion includes an arcuate shaped band-like leg member having a diameter of 1.0 to 2.5 d. In addition, leg portion 16 is dimensioned so as to have a length of 1.5 to 2.5 d.

Figure 6:
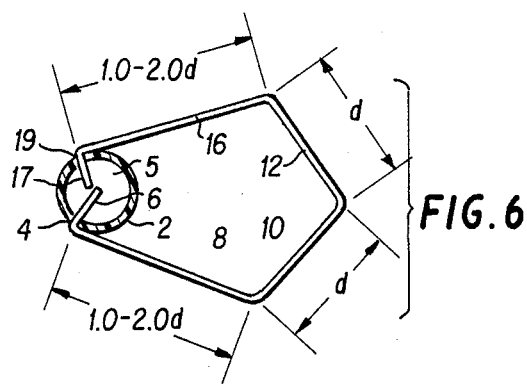
FIG. 6 illustrates a top view of a third embodiment of the present invention.

A third embodiment is shown in FIG. 6 wherein first straight flat leg portion 8 is dimensioned so as to be of substantially the same length as second flat leg portion 16. In addition, first flat intermediate leg portion 10 and second flat intermediate leg portion 12 each are of a length of approximately d. In addition, the pole member 2 includes an opening 19 formed in a wall portion thereof opposite opening 4. In addition, the second flat leg portion 16 includes a second flat end portion 17 positioned within the opening 19 and within the opening 5 extending at least part of the length of the pole 2.

Figure 7:
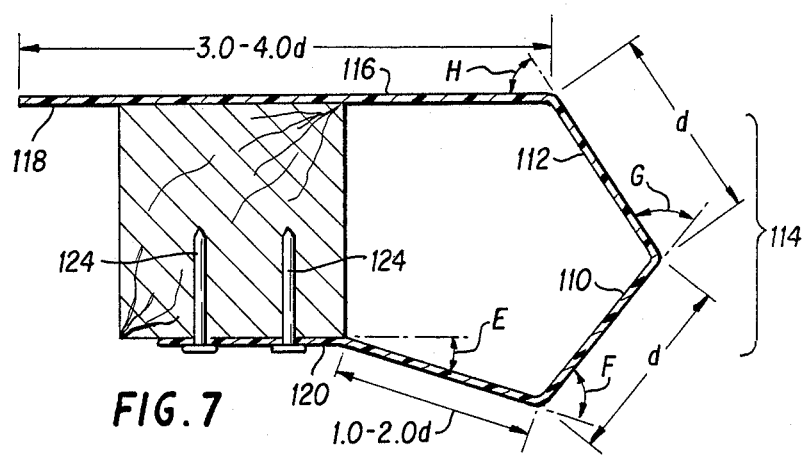
FIG. 7 shows a top view of a fourth embodiment of the present invention.

A fourth embodiment of the present invention is illustrated in FIG. 7 which illustrates a plant support device utilizing a longitudinally extending wooden support pole 121. Attached to pole 121 is a flexible band-like clip member having a first flat end portion 120 connected to the support 121. A first straight leg portion 108 is also provided which is connected to the flat end portion 120 at a first predetermined angle E of from 5° to 25°. A flexible intermediate leg portion 114 is also provided and which consists of a first leg portion 110 and a second leg portion 112 wherein leg portion 110 forms an angle F of a value of 50° to 70° with first straight flat leg portion 108. Leg portion 112 forms an angle G with leg portion 110 wherein angle G is from 60° to 80°. Lastly, the second straight flat leg portion 116 is connected to leg portion 112 of the flexible intermediate leg portion 114 and extends to a position adjacent the support in a manner so as to be biased against the support 121 by the flexible intermediate leg portion 114. Second straight flat leg portion 116 forms angle H with leg portion 112 wherein angle H is of a value of from 50° to 70°. The dimensioning of the above-noted leg portions is such that leg portion 108 is of a length at 1.0 to 2.0 d, leg portion 110 and 112 have a length of a approximately d while leg portion 116 is of a length of 3.0 to 4.0 d. As shown in FIG. 7, also provided is an end portion 118 of leg portion 116 which extends beyond a corner portion of support 121 to a side of support 121 opposite the flexible intermediate leg portion. Flat end portion 120 has apertures formed therein within which securing members 122 are provided so as to fit within openings 124, 124 formed within support 121.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A plant support device, comprising:
   a longitudinally extending tubular support member having a first opening formed in a wall portion thereof and a longitudinal opening extending at least part of the length of said support member;
   a flexible band-like clip member having a first flat end portion positioned in said first opening and within said longitudinal opening;
   a first straight flat leg portion connected to said first flat end portion;
   a flexible intermediate leg portion connected to said first leg portion; and
   a second straight flat leg portion, unsecured from said support member, connected to said flexible intermediate leg portion and having a free end extending to a position adjacent said first flat end portion, extending to a side of said support opposite said flexible intermediate portion, and exterior of said tubular support member so as to allow for insertion of a portion of a plant within said clip by being passed between said second straight flat leg portion and said support member.

2. A plant support device as set forth in claim 1, wherein said flexible intermediate leg portion comprises a first flat intermediate leg portion connected to said first leg portion at a first predetermined angle and a second flat intermediate leg portion connected to said first flat intermediate leg portion at a second predetermined angle and connected to said second flat leg portion at a third predetermined angle.

3. A plant support device as set forth in claim 1, wherein said second flat leg portion includes an end portion located opposite said flexible intermediate portion and extending beyond said first flat end portion to a side of said support opposite said flexible intermediate portion.

4. A plant support device as set forth in claim 1, wherein said flexible intermediate leg portion comprises an arcuate shaped band-like leg member.

5. A plant support device as set forth in claim 4, wherein said second flat leg portion includes an end portion opposite said flexible intermediate portion extending beyond said first flat end portion to a side of said support member opposite said flexible intermediate portion.

* * * * *